United States Patent
Milby

(10) Patent No.: US 7,958,084 B2
(45) Date of Patent: Jun. 7, 2011

(54) SYSTEM, METHOD, AND COMPUTER-READABLE MEDIUM FOR PROVIDING A REGIONALIZED FILE SYSTEM

(75) Inventor: Gregory Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 456 days.

(21) Appl. No.: 12/118,918

(22) Filed: May 12, 2008

(65) Prior Publication Data
US 2009/0282084 A1    Nov. 12, 2009

(51) Int. Cl.
G06F 7/00 (2006.01)
(52) U.S. Cl. .......................... 707/604; 707/611; 711/100
(58) Field of Classification Search ........................ None
See application file for complete search history.

(56) References Cited

U.S. PATENT DOCUMENTS

| | | | |
|---|---|---|---|
| 5,018,060 A * | 5/1991 | Gelb et al. .......................... 1/1 |
| 6,594,726 B1 * | 7/2003 | Vishlitzky et al. ............. 711/113 |
| 7,447,863 B2 * | 11/2008 | Toume et al. .................. 711/170 |
| 2005/0044313 A1 * | 2/2005 | Amemiya et al. ............. 711/114 |
| 2008/0086446 A1 * | 4/2008 | Zhang et al. ...................... 707/2 |
| 2009/0198748 A1 * | 8/2009 | Ash et al. ....................... 707/204 |

* cited by examiner

*Primary Examiner* — Tim T. Vo
*Assistant Examiner* — Hasanul Mobin
(74) *Attorney, Agent, or Firm* — Steve McDonald

(57) ABSTRACT

A system, method, and computer readable medium that facilitate operation of a file system capable of dividing an existing homogeneous file system into a series of regions, with each region accommodating storage devices having compatible characteristics are provided. The file system is divided into logical regions, with each region containing a particular class of storage devices possessing a particular set of common storage traits. The regionalization of the file system provides for all cylinders of storage devices sharing a common storage characteristic to be contained within a single region, and dedicated file system logic can be written to service that region. A master index configuration implemented in accordance with disclosed embodiments includes a region descriptor construct that enables cylinder index descriptors associated with cylinders of storage devices sharing a common storage characteristic to be grouped into regions.

17 Claims, 5 Drawing Sheets

SYSTEM, METHOD, AND COMPUTER-READABLE MEDIUM FOR PROVIDING A REGIONALIZED FILE SYSTEM

BACKGROUND

A database is a collection of stored data that is logically related and that is accessible by one or more users or applications. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

Premium database products implement their own file systems to facilitate the storage of data in database objects, e.g., tables, indexes, etc. The motivation for doing this is that it enables the database vendor to optimize the file system for their database and targeted customer class of applications. However, a common trait of a database vendor developed file system is that the file system supports only a specific class of storage devices possessing a fixed set of characteristics, such as storage that is reliable, e.g., protected from single device failures and single storage path failures, storage that is non-volatile, storage that is re-writeable, or other storage device characteristics. Such file systems thus may be characterized as homogeneous with respect to the type of storage devices that it may support. This approach is suitable if the database customer's perceived value of their data matches the cost of the class of storage they are permitted to attach to their database system.

In recent times, however, there has been a growing desire to store what is referred to as "nearline" data in the database. Nearline data is data that the user desires to have online and available, but only wishes to access on an occasional or infrequent basis. Examples of nearline data include, for example, compliance data, fixed content, bulk storage, or short term data that is archival in nature. Since the data is only occasionally or rarely accessed, the desire is to place it on storage that is much more economical than storage used for frequently accessed data. Problematically, storage that tends to be less expensive also tends to be less reliable than more expensive storage. Also, if one considers accommodating "fixed content," i.e., non-changing data, it is desirable to place the fixed content on a write-once storage rather than a re-writable storage. However, contemporary homogeneous file systems are not capable of accommodating storage devices having markedly different storage characteristics.

SUMMARY

Disclosed embodiments provide a system, method, and computer readable medium that facilitate operation of a file system capable of dividing an existing homogeneous file system into a series of regions, with each region accommodating storage devices having compatible characteristics. By regionalizing the file system and placing compatible storage together, existing suites of file system operations may continue to function normally in a heterogeneous storage device environment. The regionalization serves to accommodate certain types of devices possessing particular storage behaviors, such as write-once devices. The regionalization of the file system provides for all cylinders of storage device sharing a common storage characteristic to be contained within a single region, and dedicated file system logic can be written to service that region.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with embodiments, a master index configuration facilitates operation of a file system capable of dividing an existing homogeneous file system into a series of regions, with each region accommodating storage devices having compatible characteristics. A diverse spectrum of storage devices may be accommodated by dividing the file system into logical regions, with each region containing a particular class of storage devices possessing a particular set of storage traits. The regionalization of the file system provides for all cylinders of storage device sharing a common storage characteristic to be contained within a single region, and dedicated file system logic can be written to service that region. A master index configuration implemented in accordance with disclosed embodiments includes a region descriptor construct that enables cylinder index descriptors associated with cylinders of storage devices sharing a common storage characteristic to be grouped into regions. The region descriptor is used in conjunction with an offset array configured to accommodate the region descriptors. Accordingly, a heterogeneous storage device environment may be accommodated by an existing suite of file system operations as described more fully hereinbelow.

Figure 1:
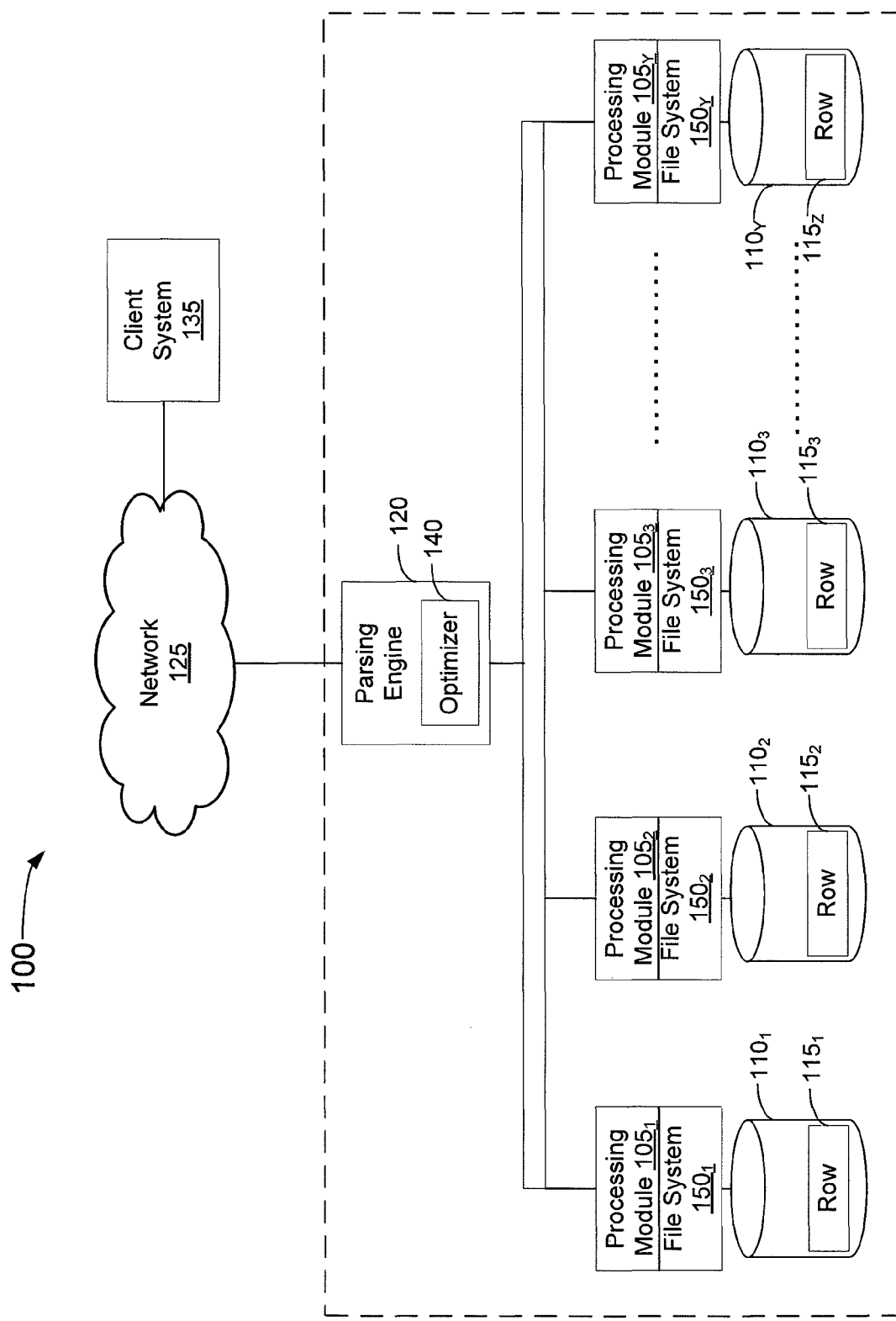
FIG. 1 is a diagrammatic representation of an exemplary architecture for a large database system that is suited for implementing embodiments disclosed herein.

FIG. 1 is a diagrammatic representation of an exemplary architecture for a large database system 100, such as a Teradata Active Data Warehousing System, that is suited for implementing embodiments disclosed herein. The database system 100 includes a relational database management system (RDBMS) built upon a massively parallel processing (MPP) platform. Other types of database systems, such as object-relational database management systems (ORDBMS) or those built on symmetric multi-processing (SMP) platforms, are also suited for use, and the depicted and described architecture is chosen only to facilitate an understanding of the disclosed embodiments.

As shown, the database system 100 includes one or more processing modules $105_1 \ldots _Y$ that manage the storage and retrieval of data in data-storage facilities $110_1 \ldots _Y$. Each of the processing modules $105_1 \ldots _Y$ manages a portion of a database that is stored in a corresponding one of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Z$ of the tables are stored across multiple data-storage facilities $110_1 \ldots _Y$ to ensure that the system workload is distributed evenly across the processing modules $105_1 \ldots _Y$. A parsing engine 120 organizes the storage of data and the distribution of table rows $115_1 \ldots _Z$ among the processing modules $105_1 \ldots _Y$. The parsing engine 120 also coordinates the retrieval of data from the data-storage facilities $110_1 \ldots _Y$ in response to queries received from a user, such as one using a client computer system 135 connected to the database system 100 through a network connection 125. The parsing engine 120, on receiving an incoming database query, applies an optimizer component 140 to the query to assess the best plan for execution of the query. Selecting the optimal query-execution plan includes, among other things, identifying which of the processing modules $105_1 \ldots _Y$ must take place in executing the query and which database tables are involved in the query, as well as choosing which data-manipulation techniques will serve best in satisfying the conditions of the query. Database statistics are used in making these assessments during construction of the query-execution plan. The database system typically receives queries in a standard format, such as the Structured Query Language (SQL) put forth by the American National Standards Institute (ANSI). A file system $150_1 \ldots _Y$ instance hosted by respective processing modules $105_1 \ldots _Y$ provides for navigation of tables maintained in the data storage facilities $110_1 \ldots _Y$ via file system regions implemented in accordance with disclosed embodiments as described more fully hereinbelow.

Figure 2:
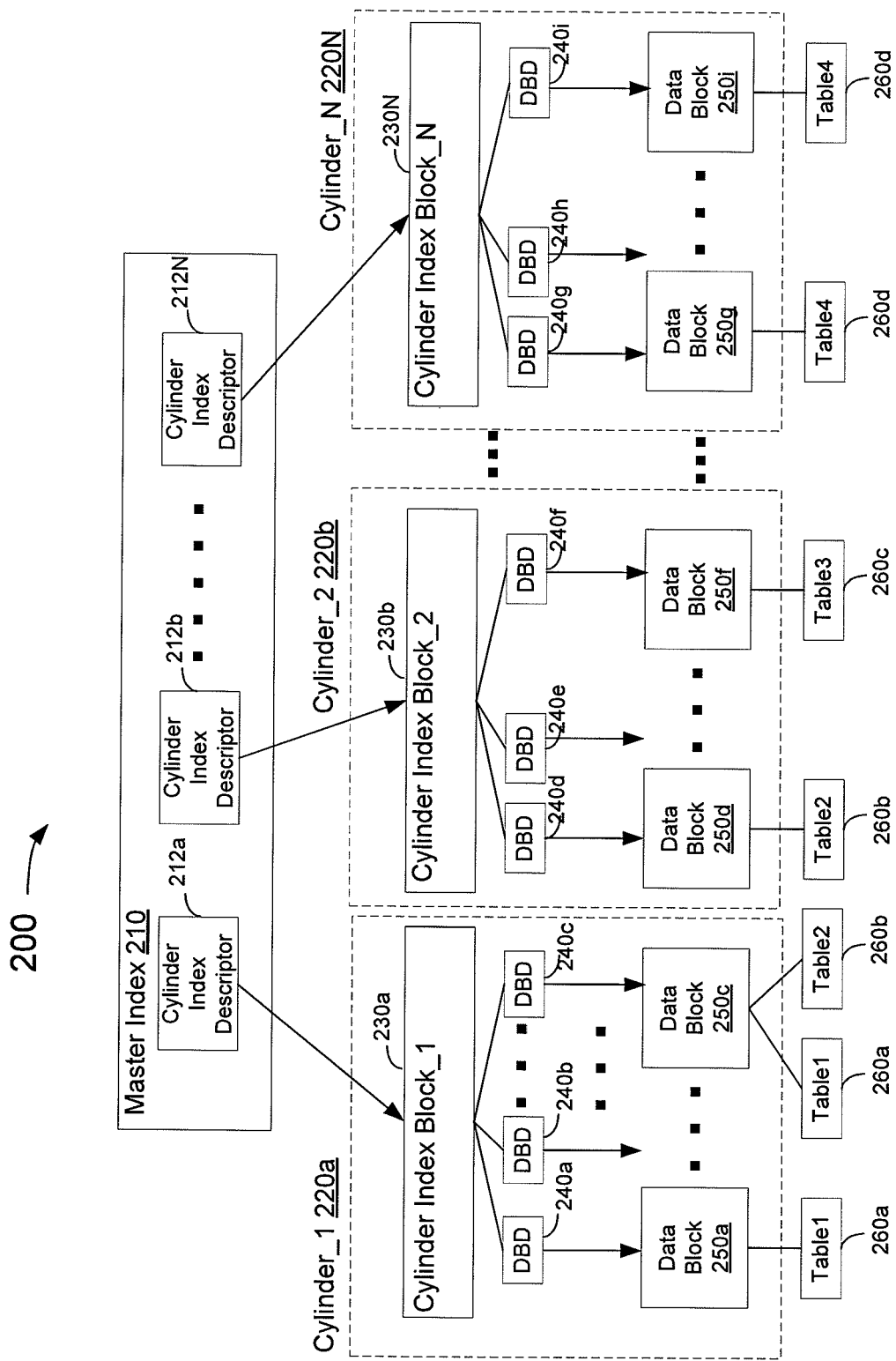
FIG. 2 is a diagrammatic representation of a master index configuration as may be maintained by the database system depicted in FIG. 1.

FIG. 2 is a diagrammatic representation of a master index configuration 200 as may be maintained by the database system 100. At one level of abstraction, the file system appears as an ordered series of cylinders 220a-220N (illustratively designated Cylinder_1-Cylinder_N) each containing a series of data blocks 250a-250i. Cylinders 220a-220N may be implemented as physical or logical cylinders. Any number of storage devices may be included in the system, and the cylinders 220a-220N thus may comprise cylinders of a plurality of storage devices. At another level of abstraction, the file system is organized along the lines of a series of tables 260a-260d, ordered by their identifiers, with the database rows of each table residing within a series of the data blocks 250a-250i. A master index 210 includes cylinder index descriptors 212a-212N that each describes a respective cylinder 220a-220N. For example, a cylinder index descriptor specifies what table(s), or portions thereof, are maintained by a corresponding cylinder and the range of table rows maintained by the cylinder. Each cylinder 220a-220N has a space allocated for a respective cylinder index block 230a-230N that describes where particular rows are located within the cylinder, e.g., within a particular data block. Likewise, each of the data blocks 250a-250i have a respective data block descriptor (DBD) 240a-240i that specifies where particular rows are maintained within the corresponding data block 250a-250i. The master index, cylinder index descriptors, cylinder index blocks, and data block descriptors conjunctively define table-to-data block mappings that facilitate navigating the file system.

Attempting to integrate diverse storage types into a homogeneous based file system negatively impacts a number of important file system operations. In a homogeneous file system, all cylinders are considered equal. Thus, the file system may create blocks on an adjacent cylinder to accommodate additional rows of a table if a cylinder becomes filled, i.e., all data blocks on that cylinder are used up. The process of permitting a table to spill from one cylinder and onto another cylinder is referred to herein as cylinder migration.

Contemporary database systems disadvantageously are not adapted to facilitate cylinder migration for a heterogeneous based system. For example, assume a table is being written to a cylinder on a write-once storage device. In the event the cylinder becomes full, an adjacent cylinder accessed for migration may comprise a cylinder of a different storage device type, e.g., a cylinder on a re-writeable device, in a system that features a heterogeneous storage environment. Thus, the algorithm supporting the migration of the table rows from one cylinder to the next may encounter various faults. Other file system operations may encounter a related set of problems, such as cylinder defragmentation and cylinder packing (i.e., multiple source cylinders packed into a fewer number of target cylinders). In general, numerous scenarios exist for any file system and/or algorithm that requires migration of data between one cylinder and another to become compromised if the file system or algorithm is implemented in a heterogeneous system featuring adjacent cylinders that may have markedly different storage qualities. Thus, contemporary file systems that provide for data migration between cylinders of multiple storage mediums disadvantageously require that the storage devices providing the cylinders 220a-220N are homogeneous with respect to the storage device characteristics.

Figure 3:
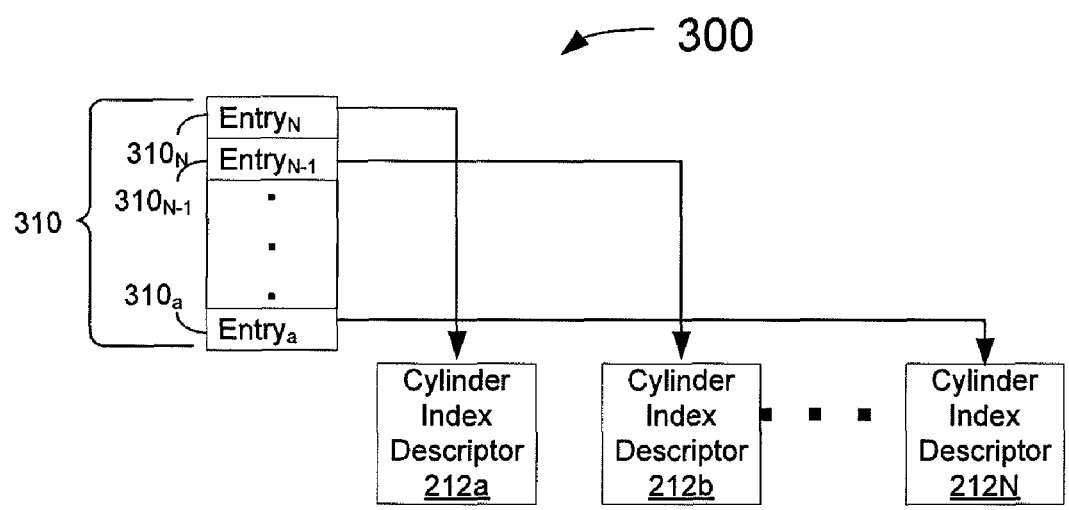
FIG. 3 is a diagrammatic representation of a master index configuration that may be implemented in the database system depicted in FIG. 1 that supports a homogeneous storage system.

FIG. 3 is a diagrammatic representation of a master index 300 configuration that may be implemented in system 100 that supports a homogeneous based file system. The master index 300 may include an offset array 310 that includes various entries $310_a$-$310_N$. Each array entry $310_a$-$310_N$ provides a reference, e.g., a pointer or offset, to a corresponding cylinder index descriptor 212a-212N. In accordance with an embodiment, an offset array may include references to region descriptors to provide a regionalized file system that facilitates a heterogeneous based file system as described more fully hereinbelow.

Figure 4:
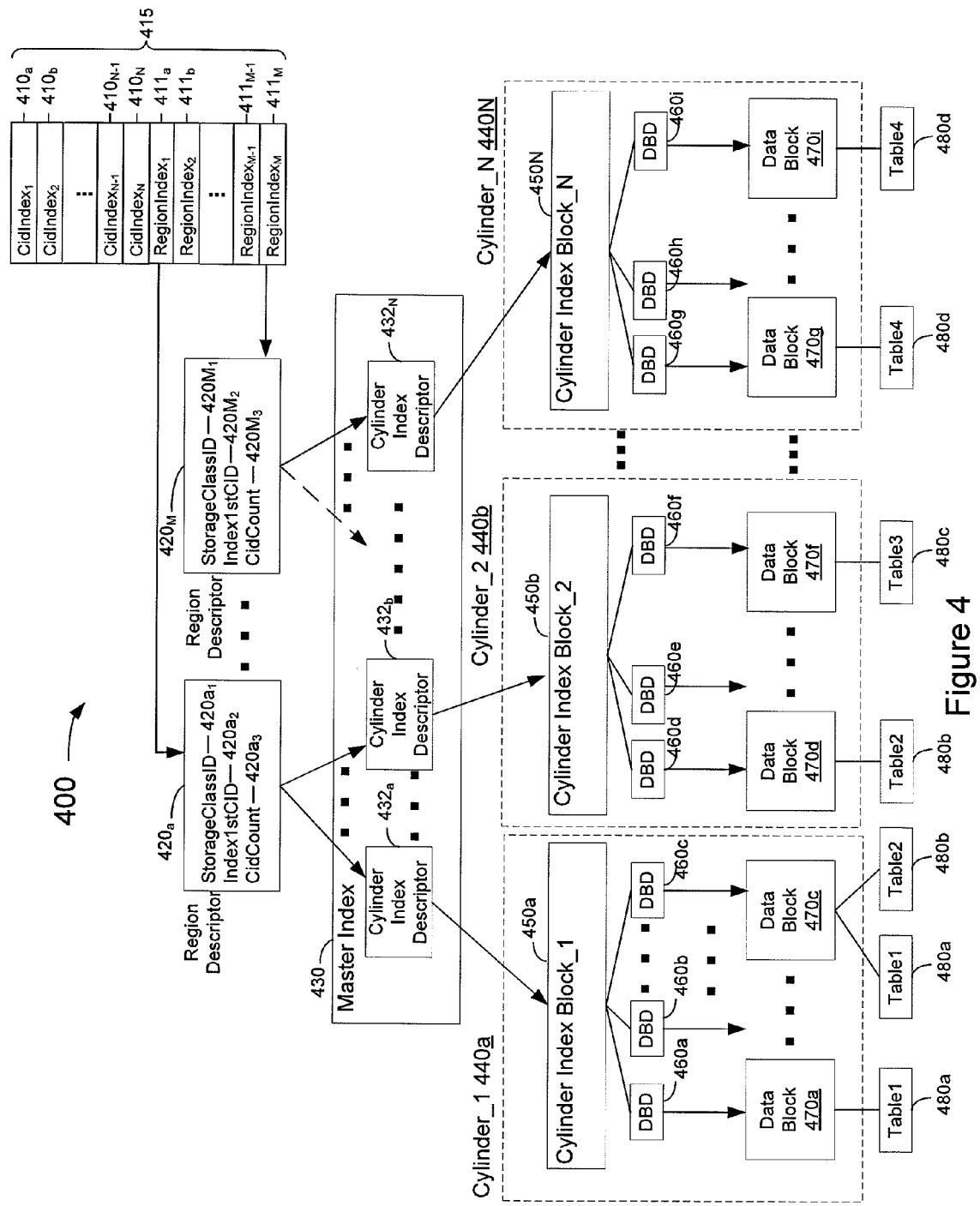
FIG. 4 is a diagrammatic representation of master index configuration implemented in accordance with an embodiment.

FIG. 4 is a diagrammatic representation of master index 400 configuration implemented in accordance with an embodiment. The master index 400 supports the division of the file system into a series of "Regions" of the file system.

The master index 400 configuration implemented in accordance with disclosed embodiments includes a region descriptor construct that enables cylinder index descriptors to be grouped into regions. The region descriptor is used in conjunction with an offset array 415 configured to accommodate the region descriptors. To this end, the offset array 415 includes various cylinder index descriptor entries $410_a$-$410_N$ that provide a reference, e.g., a pointer or offset, to a corresponding cylinder index descriptor $432_a$-$432_N$. Additionally, the offset array 415 includes various region index descriptor entries $411_a$-$411_M$ that provide a reference, e.g., a pointer or offset, to a corresponding region descriptor $420_a$-$420_M$.

Each region descriptor $420_a$-$420_M$ contains three fields in accordance with an embodiment. A storage class identifier field $420a_1$-$420M_1$ specifies an identifier of the storage class supported by the corresponding region. A first CID field $420a_2$-$420M_2$ specifies the index into the area containing the offset to the first CID belonging to the corresponding storage class region. For example, the first CID field $420a_2$ may specify an index into an offset area to the CID $432a$ of a first cylinder $440a$ of the storage class region associated with the region descriptor $420_a$. A CID count field $420a_3$-$420M_3$ specifies the number of CIDs $432_a$-$432_N$ currently belonging to the corresponding storage class region. Accordingly, the first CID field and the CID count field may be conjunctively utilized to access any CID of a corresponding region descriptor.

Cylinders of a particular storage class region share a set of storage class characteristics. For example, assuming the storage class identifier field $420a_1$ specifies a storage class of write-once, each of the cylinders $440a$-$440b$ associated with the region descriptor $420_a$ allocated for write-once cylinders comprise cylinders of one or more storage devices sharing a storage characteristic, namely a write-once storage characteristic. Thus, data may be advantageously migrated between any number of the cylinders $440a$-$440b$ in the regionalized heterogeneous system because each of the cylinders $440a$-$440b$ provide a homogeneous storage class portion of the heterogeneous storage environment.

Cylinder index descriptors $432_a$-$432_N$ describe a respective cylinder $440a$-$440N$, e.g., what table(s), or portions thereof, are maintained by a respective cylinder and the range of table rows maintained by the cylinder. Each cylinder $440a$-$440N$ has a space allocated for a respective cylinder index block $450a$-$450N$ that describes where particular rows are located within the cylinder, e.g., within a particular data block. Likewise, each of the data blocks $470a$-$470i$ have a respective data block descriptor $460a$-$460i$ that specifies where particular rows are maintained within the corresponding data block $470a$-$470i$.

In contemporary implementations, navigating the file system comprises searching for a table based on the table ID, followed by searching for the desired row within a data block. In a system featuring a master index 400 configuration implemented in accordance with disclosed embodiments, a region ID is passed along and accompanies the table ID. Thus, navigating a file system featuring the master index 400 comprises first finding the region, then finding the table based on its identifier, and finally finding the desired row within a data block.

Figure 5:
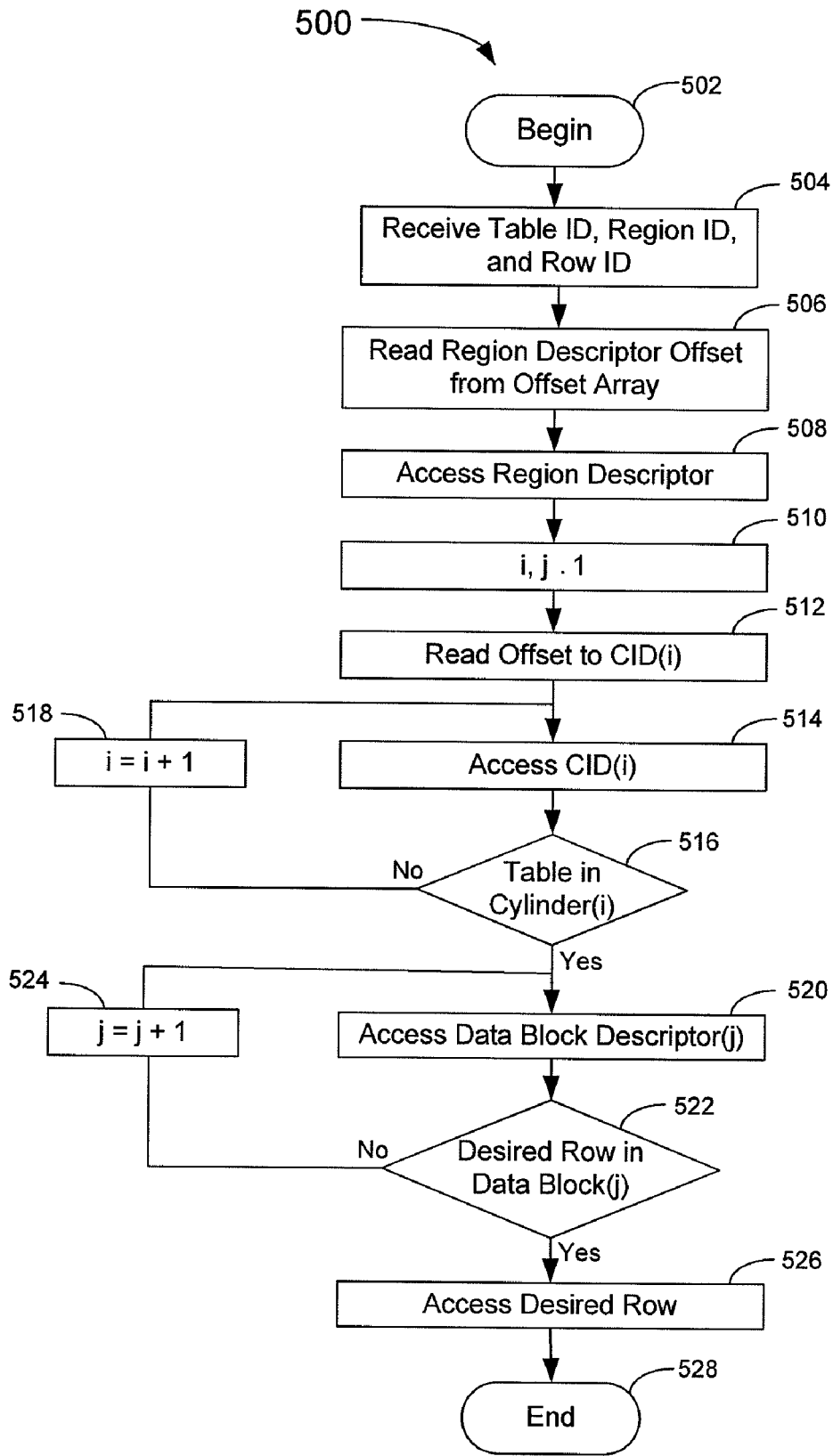
FIG. 5 is a flowchart that depicts a file system navigation routine configured according to disclosed embodiments for implementation in a system featuring heterogeneous storage devices.

FIG. 5 is a flowchart 500 that depicts a file system navigation routine for implementation in a system featuring a heterogeneous storage device environment according to disclosed embodiments. The processing steps of FIG. 5 may be implemented as computer-executable instructions executable by a processing system, such as the MPP system 100 depicted in FIG. 1.

The navigation routine is invoked (step 502), and a table ID, region ID, and row ID are received by the file system (step 504). The region ID corresponds to a particular region index entry $411_a$-$411_M$. The region descriptor offset is then read by the file system from the index entry $411_a$-$411_M$ that corresponds with the region ID (step 506), and the appropriate region descriptor is then accessed by the offset read from the offset array (step 508). Two counter variables i and j may be initialized (step 510), and an offset to a first CID is then read (step 512). For example, assuming the region descriptor $420_a$ is accessed via the region offset from the offset array 415, an offset to a first CID $432a$ is read from the Index 1st CID field $420a_2$. The accessed CID(i) is then evaluated to determine if the table is in the cylinder corresponding to the CID(i) (step 516). If the table is not in the CID(i), the variable i may be incremented (step 518), and a next CID associated with the region descriptor is then accessed according to step 514.

When the table is located within a CID associated with the region descriptor, the navigation routine may access a first data block descriptors) of the cylinder(i) (step 520), and the first data block descriptors) is evaluated to determine if the desired row of the table is located within the data block corresponding to the data block descriptors) (step 522). If the desired row is not located within the data block(j), the variable j may be incremented (step 524), and a next data block descriptors) of the cylinder(i) may then be accessed according to step 520. When a data block is identified as having the desired row, the row is then accessed (step 526), and the file system navigation routine cycle may end (step 528)

The grouping of compatible cylinders into regions provides for normal file system operational capabilities within a region. The existence of storage class regions eliminates the detrimental scenarios discussed hereinabove. For instance, when a large number of inserts results in the need for a table to migrate from a source cylinder onto an adjacent cylinder, the fact that both cylinders are located in the same region ensures that the adjacent cylinder is fully compatible with the source cylinder and thus the table can be migrated to the adjacent cylinder.

Advantageously, a vendor need only implement a SQL mechanism that enables a set of storage characteristics to be associated with a particular storage class region. For example, a CREATE STORAGE CLASS SQL statement may be implemented to create a Storage Class that may then be associated with various database objects, such as tables, indexes, LOB columns, etc. A storage class itself can be considered as being a requirements specification. Given a fixed set of storage attributes that can be used to characterize storage, a storage class definition specifies which of those storage attributes are to be required (i.e., must have the characteristic), excluded (i.e., must not have the characteristic), and immaterial (e.g., a storage class may be acceptable that doesn't have a specified storage characteristic, but if storage supplies run low then it is acceptable to be provided storage that does have the characteristic as well). When storage classes are used in conjunction with disclosed embodiments, a storage class region is created within the file system for every storage class created at the database level.

The association of a set of storage characteristics with a file system storage class region provides the ability to ensure that like cylinders are stored together. All cylinders stored within a particular region advantageously possess a compatible set of storage characteristics.

The disclosed embodiments provide a file system capable of dividing an existing homogenous file system into a series of regions, with each region accommodating storage devices having compatible characteristics. By regionalizing the file system and placing compatible storage devices together, the existing suite of file system operations can continue to function normally in a heterogeneous storage device environment. Furthermore, the regionalization serves as an enabler for handling certain types of devices possessing "peculiar" behaviors, such as write-once devices. The regionalization of the file system ensures that all cylinders of any number of storage devices sharing a common storage characteristic or class are contained or otherwise allocated within a single region, and dedicated file system logic can be written to service that region.

The flowchart of FIG. 5 depicts process serialization to facilitate an understanding of disclosed embodiments and is not necessarily indicative of the serialization of the operations being performed. In various embodiments, the processing steps described in FIG. 5 may be performed in varying order, and one or more depicted steps may be performed in parallel with other steps. Additionally, execution of some processing steps of FIG. 5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanied drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of allocating storage space in a data processing system, the method comprising:

deploying a plurality of storage devices for data storage in the system;

respectively characterizing each of the plurality of storage devices according to one of a plurality of storage classes;

associating a respective region descriptor with each of the plurality of storage devices, wherein each region descriptor contains a number of fields including a storage class identifier field which specifies an identifier of the corresponding storage class associated with the corresponding storage device; and allocating in an offset array a plurality of region index descriptor entries and a plurality of cylinder index descriptor entries which are different from the region index descriptor entries, wherein (i) each of the plurality of region index descriptor entries references a respective one of a plurality of region descriptors, (ii) each of the plurality of cylinder index descriptor entries references a respective one of a plurality of cylinder index descriptors, and (iii) the number of region index descriptor entries is less than the number of cylinder index descriptor entries;

wherein each of the plurality of region descriptors is associated with a respective one of the plurality of storage classes and contains a number of fields including (i) a storage class identifier which specifies an identifier of the corresponding storage class associated with the corresponding device, (ii) a first cylinder index descriptor field which specifies an index into an area containing an offset to a first cylinder belonging to the corresponding storage class, and (iii) a cylinder index descriptor count field which specifies a number of cylinder index descriptors currently belonging to the corresponding storage class.

2. The method of claim 1, wherein a first storage device and a second storage device are associated with a common storage class, wherein associating a region descriptor comprises associating a first region descriptor with the first storage device and the second storage device.

3. The method of claim 1, wherein a first storage device is associated with a first storage class, and wherein a second storage device is associated with a second storage class, and wherein associating a region descriptor comprises associating a first region descriptor with the first storage device and associating a second region descriptor with the second storage device.

4. The method of claim 1, further comprising associating a first region descriptor with a plurality of cylinder index descriptors each associated with a respective cylinder of a plurality of cylinders, wherein each respective cylinder is associated with a first storage class.

5. The method of claim 1, wherein the plurality of cylinders are provided by a plurality of storage devices each characterized by the first storage class.

6. A computer-readable medium having computer-executable instructions for execution by a processing system, the computer-executable instructions for configuring storage devices for access by a file system, the computer-executable instructions, when executed, cause the processing system to:

respectively characterize each of a plurality of storage devices according to one of a plurality of storage classes;

associate a respective region descriptor of a plurality of region descriptors with each of the plurality of storage devices, wherein each region descriptor contains a number of fields including (i) a storage class identifier field which specifies an identifier of the corresponding storage class associated with the corresponding storage device; and allocate in an offset array a plurality of region index descriptor entries and a plurality of cylinder index descriptor entries which are different from the region index descriptor entries, wherein (i) each of the plurality of region index descriptor entries references a respective one of the plurality of region descriptors, (ii) each of the plurality of cylinder index descriptor entries references a respective one of a plurality of cylinder index descriptors, and (iii) the number of region index descriptor entries is less than the number of cylinder index descriptor entries.

7. The computer-readable medium of claim 6, further comprising instructions that associate a first storage device and a second storage device with a common storage class, wherein the instructions that associate a region descriptor comprise instructions that associate a first region descriptor with the first storage device and the second storage device.

8. The computer-readable medium of claim 6, wherein the instructions that respectively characterize each of the plurality of storage devices comprise instructions that characterize a first storage device according to a first storage class and characterize a second storage device according to a second storage class, and wherein the instructions that associate a respective region descriptor comprise instructions that associate a first region descriptor with the first storage device and associate a second region descriptor with the second storage device.

9. The computer-readable medium of claim 6, further comprising instructions that associate a first region descriptor with a plurality of cylinder index descriptors each associated with a respective cylinder of a plurality of cylinders, wherein each respective cylinder is associated with a first storage class.

10. The computer-readable medium of claim 9, wherein the plurality of cylinders are provided by a plurality of storage devices each characterized according to the first storage class.

11. The computer-readable medium of claim 6, wherein the number of fields contained in each of the plurality of region descriptors further includes (ii) a first cylinder index descriptor field which specifies an index into an area containing an offset to a first cylinder belonging to the corresponding storage class.

12. The computer-readable medium of claim 11, wherein the number of fields contained in each of the plurality of region descriptors further includes (iii) a cylinder index descriptor count field which specifies a number of cylinder index descriptors currently belonging to the corresponding storage class.

13. A database management system, comprising:
a first storage device assigned to a first storage class;
a second storage device assigned to a second storage class;
a storage medium having a first region descriptor that is associated with the first storage class and a second region descriptor that is associated with the second storage class, wherein cylinders of the first storage device are accessible via the first region descriptor, and wherein cylinders of the second storage device are accessible via the second region descriptor; and
an offset array having a first entry that specifies a first offset to the first region descriptor and a second entry that specifies a second offset to the second region descriptor, wherein the first region descriptor includes a cylinder index descriptor field that specifies a third offset to a first cylinder of the first storage device, and wherein the second region descriptor includes a cylinder index descriptor field that specifies a fourth offset to a first cylinder of the second storage device.

14. The system of claim 13, further comprising a plurality of storage devices that are assigned to the first storage class, wherein cylinders of the plurality of storage devices are accessible via the first region descriptor.

15. The system of claim 13, wherein the first region descriptor includes a storage class identifier field that specifies an identifier of the first storage class to which the first storage device has been assigned, and wherein the second region descriptor includes a storage class identifier field that specifies an identifier of the second storage class to which the second storage device has been assigned.

16. The system of claim 13, further comprising a plurality of storage devices that are assigned to the first storage class, and wherein the file system migrates data from a first cylinder of the plurality of storage devices to a second cylinder of the plurality of storage devices.

17. The system of claim 13, further comprising a plurality of storage devices that are assigned to the first storage class, wherein the plurality of storage devices share a common storage characteristic.

\* \* \* \* \*